United States Patent [19]
Phillips et al.

[11] Patent Number: 5,623,311
[45] Date of Patent: Apr. 22, 1997

[54] MPEG VIDEO DECODER HAVING A HIGH BANDWIDTH MEMORY

[75] Inventors: Larry Phillips, Collingswood; Shuji Inoue, Mount Holly, both of N.J.; Edwin R. Meyer, Bensalem, Pa.

[73] Assignee: Matsushita Electric Corporation of America, Secaucus, N.J.

[21] Appl. No.: 330,579

[22] Filed: Oct. 28, 1994

[51] Int. Cl.$^6$ ..................................................... H04N 7/12
[52] U.S. Cl. .................. 348/396; 348/384; 348/416; 348/405; 348/411; 348/715; 348/717
[58] Field of Search .................................. 348/396, 397, 348/398, 384, 409, 415, 412, 416, 451, 452

[56] References Cited

U.S. PATENT DOCUMENTS

| | | | |
|---|---|---|---|
| 4,758,881 | 7/1988 | Laspada | 358/21 |
| 4,825,287 | 4/1989 | Baji et al. | 358/160 |
| 4,924,307 | 5/1990 | Landowski et al. | 348/416 |
| 5,136,662 | 8/1992 | Maruyama et al. | 348/717 |
| 5,170,259 | 12/1992 | Niihara | 348/416 |
| 5,267,334 | 11/1993 | Normille et al. | 348/409 |
| 5,311,309 | 5/1994 | Erzoz et al. | 348/452 |
| 5,365,272 | 11/1994 | Siracusa | 348/415 |
| 5,376,969 | 12/1994 | Zdepski | 348/384 |
| 5,379,356 | 1/1995 | Purcell et al. | 348/715 |
| 5,398,072 | 3/1995 | Auld | 382/49 |
| 5,426,463 | 6/1995 | Reininger et al. | 348/415 |
| 5,479,212 | 12/1995 | Kurobe et al. | 348/409 |

OTHER PUBLICATIONS

"Advanced Information", *RDRAM Reference Manual*, pp. 3–7 and 12.
"IBM MPEG–2 Decoder Chip User's Guide", *IBM*, Second Edition (Jun. 1994).
"MPEG–2/CCIR 601 Video Decoder", *SGS–Thomson Microelectronics*, pp. 1–84, (Jul. 1994).
"IBM MPEG-2 Decoder Chip's User's Guide", *IBM*, Second Edition (Jun. 1994).

*Primary Examiner*—Tommy P. Chin
*Assistant Examiner*—Anand Rao
*Attorney, Agent, or Firm*—Ratner & Prestia

[57] ABSTRACT

A decoder for a video signal encoded according to the MPEG-2 standard includes a single high-bandwidth memory and a digital phase-locked loop. This memory has a single memory port. The memory is used to hold 1) the input bit-stream, 2) first and second reference frames used for motion compensated processing, and 3) image data representing a field that is currently being decoded. The decoder includes circuitry which stores and fetches the bit-stream data, fetches the reference frame data, stores the image data for the field that is currently being decoded in block format and fetches this image data for conversion to raster-scan format. All of these memory access operations are time division multiplexed and use the single memory port. The digital phase locked loop (DPLL) counts pulses of a 27 MHz system clock signal, defined in the MPEG-2 standard, to generate a count value. The count value is compared to a succession of externally supplied system clock reference (SCR) values to generate a phase difference signal that is used to adjust the frequency of the signal produced by the DPLL. In addition, the DPLL is aligned in phase by substituting respective portions of the SCR value for the count value developed by the DPLL and for the accumulated phase value used by the DPLL.

8 Claims, 10 Drawing Sheets

| D0:R0:C | D0:R0:B | D0:R0:A | D0:R0:C | D0:R1:B | D0:R1:A | D0:R1:C | D0:R1:B |
|---|---|---|---|---|---|---|---|
| D0:R0:C | D0:R0:B | D0:R0:A | D0:R0:C | D0:R1:B | D0:R1:A | D0:R1:C | D0:R1:B |
| D0:R0:C | D0:R0:B | D0:R0:A | D0:R0:C | D0:R1:B | D0:R1:A | D0:R1:C | D0:R1:B |
| D0:R0:C | D0:R0:B | D0:R0:A | D0:R0:C | D0:R1:B | D0:R1:A | D0:R1:C | D0:R1:B |
| D0:R0:C | D0:R0:B | D0:R0:A | D0:R0:C | D0:R1:B | D0:R1:A | D0:R1:C | D0:R1:B |
| D0:R0:C | D0:R0:B | D0:R0:A | D0:R0:C | D0:R1:B | D0:R1:A | D0:R1:C | D0:R1:B |
| D0:R0:C | D0:R0:B | D0:R0:A | D0:R0:C | D0:R1:B | D0:R1:A | D0:R1:C | D0:R1:B |
| D0:R0:C | D0:R0:B | D0:R0:A | D0:R0:C | D0:R1:B | D0:R1:A | D0:R1:C | D0:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |
| D1:R0:C | D1:R0:B | D1:R0:A | D1:R0:C | D1:R1:B | D1:R1:A | D1:R1:C | D1:R1:B |

FIG. 11A

| D0:R0:B | D0:R0:C | D0:R0:A | D0:R0:B | D0:R1:C | D0:R1:A | D0:R1:B | D0:R1:C |
|---|---|---|---|---|---|---|---|
| D0:R0:B | D0:R0:C | D0:R0:A | D0:R0:B | D0:R1:C | D0:R1:A | D0:R1:B | D0:R1:C |
| D0:R0:B | D0:R0:C | D0:R0:A | D0:R0:B | D0:R1:C | D0:R1:A | D0:R1:B | D0:R1:C |
| D0:R0:B | D0:R0:C | D0:R0:A | D0:R0:B | D0:R1:C | D0:R1:A | D0:R1:B | D0:R1:C |
| D0:R0:B | D0:R0:C | D0:R0:A | D0:R0:B | D0:R1:C | D0:R1:A | D0:R1:B | D0:R1:C |
| D0:R0:B | D0:R0:C | D0:R0:A | D0:R0:B | D0:R1:C | D0:R1:A | D0:R1:B | D0:R1:C |
| D0:R0:B | D0:R0:C | D0:R0:A | D0:R0:B | D0:R1:C | D0:R1:A | D0:R1:B | D0:R1:C |
| D0:R0:B | D0:R0:C | D0:R0:A | D0:R0:B | D0:R1:C | D0:R1:A | D0:R1:B | D0:R1:C |
| D1:R0:B | D1:R0:C | D1:R0:A | D1:R0:B | D1:R1:C | D1:R1:A | D1:R1:B | D1:R1:C |
| D1:R0:B | D1:R0:C | D1:R0:A | D1:R0:B | D1:R1:C | D1:R1:A | D1:R1:B | D1:R1:C |
| D1:R0:B | D1:R0:C | D1:R0:A | D1:R0:B | D1:R1:C | D1:R1:A | D1:R1:B | D1:R1:C |
| D1:R0:B | D1:R0:C | D1:R0:A | D1:R0:B | D1:R1:C | D1:R1:A | D1:R1:B | D1:R1:C |
| D1:R0:B | D1:R0:C | D1:R0:A | D1:R0:B | D1:R1:C | D1:R1:A | D1:R1:B | D1:R1:C |
| D1:R0:B | D1:R0:C | D1:R0:A | D1:R0:B | D1:R1:C | D1:R1:A | D1:R1:B | D1:R1:C |
| D1:R0:B | D1:R0:C | D1:R0:A | D1:R0:B | D1:R1:C | D1:R1:A | D1:R1:B | D1:R1C |
| D1:R0:B | D1:R0:C | D1:R0:A | D1:R0:B | D1:R1:C | D1:R1:A | D1:R1:B | D1:R1:C |

MPEG VIDEO DECODER HAVING A HIGH BANDWIDTH MEMORY

FIELD OF THE INVENTION

The present invention relates to decoding of digitally encoded video signals and in particular to a decoder which uses a high-bandwidth memory to decode video signals that have been encoded according to the MPEG-2 standard.

BACKGROUND OF THE INVENTION

In the United States a standard has been proposed for digitally encoded high definition television signals. This standard is essentially the same as the MPEG-2 standard, proposed by the Moving Picture Experts Group (MPEG) of the International Organization for Standardization (ISO). This standard is described in a draft internal standard (DIS) publication entitled "Information Technology—Generic Coding of Moving Pictures and Associated Audio, Recommendation H.626" ISO/IEC 13818-2 DIS, 3/94 which is available from the ISO and which is hereby incorporated by reference for its teaching on the MPEG-2 digital video coding standard.

The MPEG-2 standard is actually several different standards. In MPEG-2 several different profiles are defined, each corresponding to a different level of complexity of the encoded image. For each profile, different levels are defined, each level corresponding to a different image resolution. One of the MPEG-2 standards, known as Main Profile, Main Level is intended for coding video signals conforming to existing television standards (i.e., NTSC and PAL). Another standard, known as Main Profile, High Level is intended for coding high-definition television images. Images encoded according to the Main Profile, High Level standard may have as many as 1,152 active lines per image frame and 1,920 pixels per line.

The Main Profile, Main Level standard, on the other hand, defines a maximum picture size of 720 pixels per line and 567 lines per frame. At a frame rate of 30 frames per second, signals encoded according to this standard have a data rate of 13,063,680 pixels per second. By contrast, images encoded according to the Main Profile, High Level standard have a maximum data rate of 1,152*1,920*30 or 66,355,200 pixels per second. This data rate is more than five times the data rate of image data encoded according to the Main Profile Main Level standard. The standard proposed for HDTV encoding in the United States is a subset of this standard, having as many as 1,080 lines per frame, 1,920 pixels per line and a maximum frame rate, for this frame size, of 30 frames per second. The maximum data rate for this proposed standard is still far greater than the maximum data rate for the Main Profile, Main Level standard.

Because of this range of data rates, it is desirable to have a flexible decoder which is able to decode Main Profile, High Level data as well as Main Profile, Main Level data. Since these formats may be used in widely different applications, however, it may also be desirable to have less expensive decoders which operate on several different compression formats but which may not be able to decode formats at the higher levels.

The MPEG-2 standard defines a complex syntax which contains a mixture of data and control information. Some of this control information is used to enable the signals having several different formats to be covered by the standard. Under the MPEG-2 standard, both compressed video and audio may be transmitted. While these types of information are separately encoded and decoded, they are combined in the MPEG-2 standard under the transport layer. The transport layer defines system parameters which are used to synchronize the audio and video streams and provides a structure for transferring both types of information. The focus in this application is on the encoded video information.

Even this video information, however, may exist in several different formats. These formats define images, having differing numbers of picture elements (pixels) per line, differing numbers of lines per frame or field and differing numbers of frames or fields per second. In addition, the basic syntax of the MPEG-2 Main Profile video data defines a compressed bit stream representing a sequence of images in six layers, the Sequence layer, the Group of Pictures layer, the Picture layer, the Slice layer and the Macroblock layer. Each of these layers is introduced with control information. Finally, other control information, also known as side information, (e.g. frame type, macroblock pattern, image motion vectors, coefficient zigzag patterns and dequantization information) are interspersed throughout the coded bit stream.

To effectively receive the digital images, a decoder must recognize the control portions in both the transport layer and in the layers containing the encoded video information, extract the necessary control information, and use the extracted data to process the video signal information. In addition, the decoder processes input data at varying rates but receives the data at a constant rate. This data, when processed, is stored and used to decode other data, at least some of which has been encoded using motion compensated encoding techniques. In addition, the data is transformed from a block-oriented format, used to transmit and process the data, into a raster scan format that is used to display the data. In prior art decoding systems, these processing steps are performed using separate memories. In many cases, these memories are relatively large, require dedicated supporting hardware which adds to the cost and complexity of the total system. Because these systems use several memories, it is difficult to achieve cost reductions for scaled down versions which process formats having lower data rates.

SUMMARY OF THE INVENTION

The present invention is embodied in a decoder suitable for decoding a high-definition video signals which have been encoded according to the various MPEG-2 standards. The decoder employs a single high-bandwidth memory, to hold the input data as it is received, to store the images used to decode predictively encoded data and to convert the decoded images from block format to raster format. To effectively use this memory, the system employs a mapping scheme which stores the blocks into the memory in a manner that the video information can be easily obtained both in block format for processing and in raster format for display.

According to another aspect of the invention, the decoder includes a digital phase locked loop which is used to recover a system clock signal from the input data stream.

BRIEF DESCRIPTION OF THE DRAWINGS

FIG. 9 is a data structure diagram which is useful for describing the method by which a block of pixel values is accessed from the memory shown in FIG. 5.

FIG. 10 is a data structure diagram which is useful for describing the method by which an expanded block of pixel values is accessed from the memory shown in FIG. 5 for use by the half-pixel interpolator shown in FIGS. 1 and 2.

FIGS. 11a and 11b are data structure diagrams which are useful for describing how image data is accessed across internal boundaries in the memory shown in FIG. 5.

DETAILED DESCRIPTION

While the invention is described in terms of a decoder for image data which has been encoded using either the MPEG-2 Main Profile, High Level or Main Profile Main Level standard, it is contemplated that it may be used to decode other types of encoded video information which may be decoded using multiple, large memories.

Overview

A variable length decoder according to the present invention employs a single high bandwidth memory and several distributed buffer memories along with suitable processing circuitry in order to decode a MPEG-2 encoded video signal. The single memory is used to hold 1) the encoded bit stream, 2) prediction image data from a prior frame and a subsequent frame and 3) image data is being converted from block format to raster-scan format for display. In addition, the circuitry includes a digital phase-locked loop which is used to recover a clock signal from the input data stream. The addressing scheme used to hold this data in the high-bandwidth memory and to allow the data to be accessed by the decoder is described below with reference to FIGS. 6a through 11b.

Figure 1:
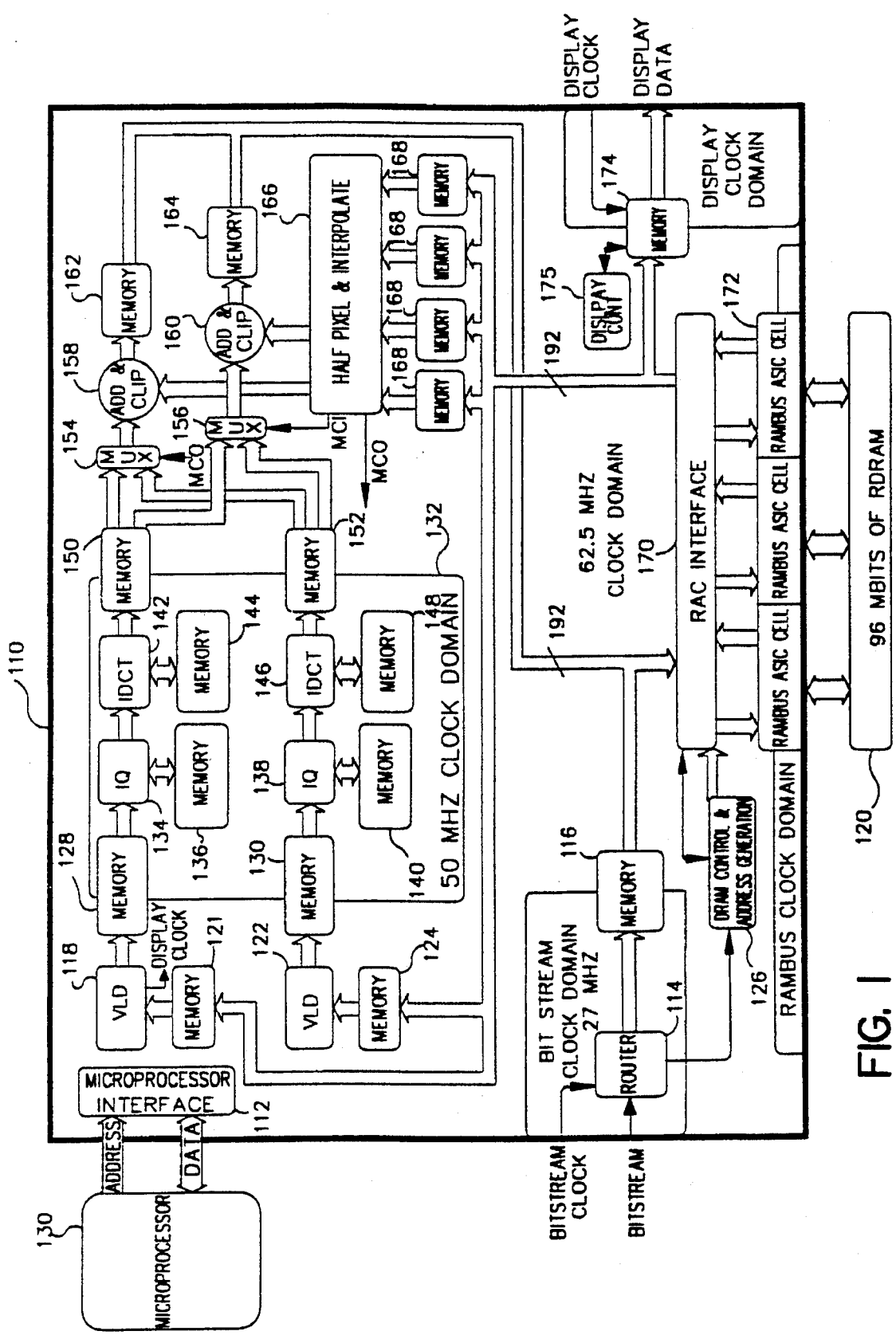
FIG. 1 block diagram of a high definition video decoder which includes an embodiment of the present invention
Figure 2:
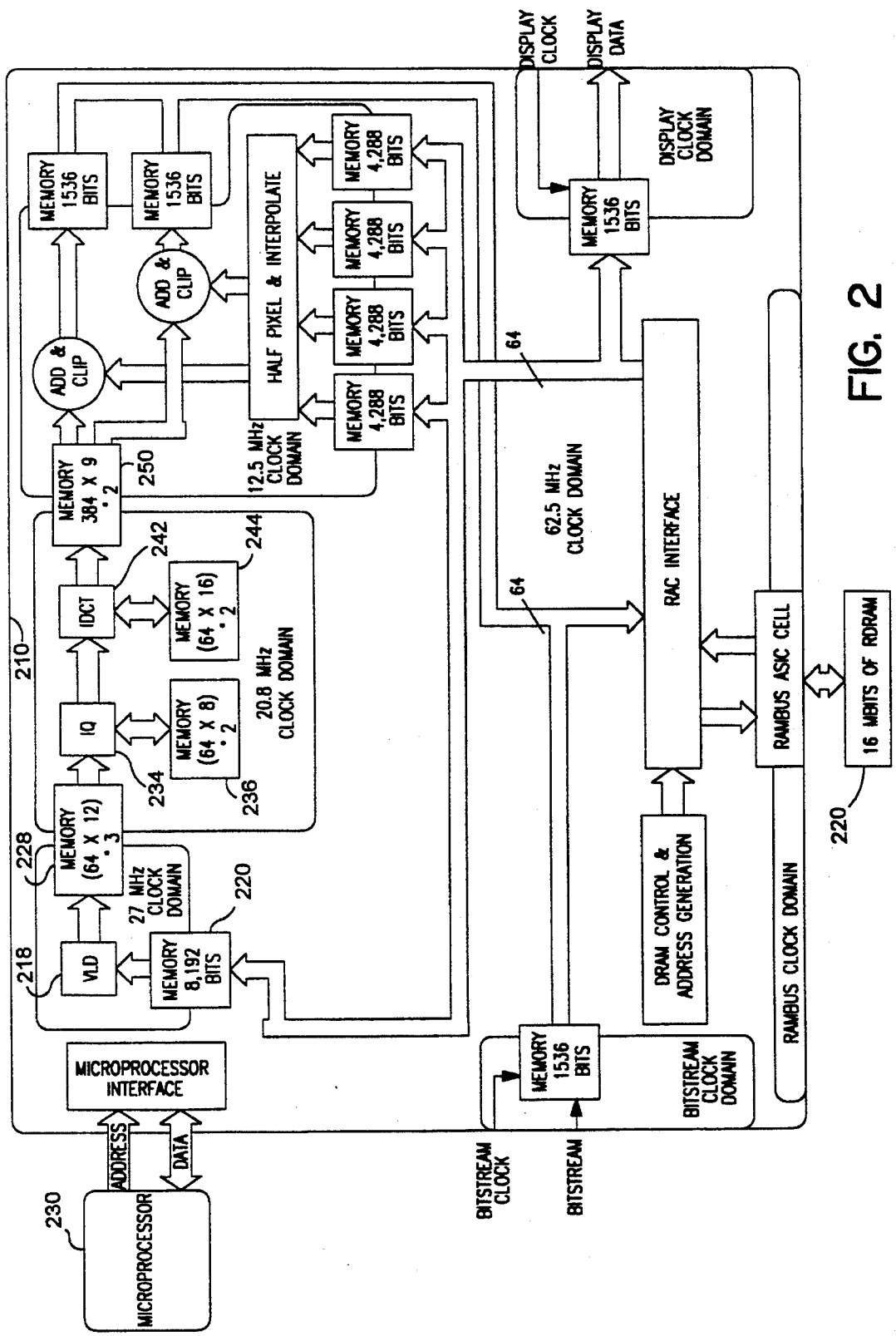
FIG. 2 is an adaptation of the decoder shown in FIG. 1 for handling encoded video signals which correspond to a broadcast standard such as PAL or NTSC.

FIGS. 1 and 2 are block diagrams of exemplary decoder systems which embody the present invention. Each of these systems includes three components, a decoding processor 110 (210 in FIG. 2) a high-bandwidth memory 120 (220 in FIG. 2) and a control microprocessor 130. The high-bandwidth memories 120 and 220 used in the exemplary embodiments of the invention are RAMBUS memory systems which are available from NEC and Toshiba. The structure of this memory is described below with reference to FIG. 5.

Briefly, the decoder shown in FIG. 1 operates as follows. As a first step, the decoder integrated circuit (IC) 110 is initialized by the microprocessor 130 in a particular configuration. If, for example, the decoder is to be used to decode Main Profile, High Level signals, the appropriate control values are applied to the internal circuitry of the decoding processor 110 via the microprocessor interface 112. For the sake of the control bus between the microprocessor 130 and each of the elements in the IC 110 has been omitted.

Once the IC 110 has been initialized, the input bit-stream is applied to the router 114. The DRAM control and address generator 126, responsive to the router 114, determines a location in the memory 120 at which the input bit-stream is to be stored. In the exemplary embodiment of the invention, a portion of the memory 120 is reserved for use as a buffer to hold the input bit-stream. This buffer area corresponds to the VBV buffer which is specified in the MPEG-2 standard to hold bit-stream data before it is decoded.

According to the standard, before decoding may begin, this buffer must hold an amount of data specified in a field of the Sequence header of the bit stream. This constraint ensures that there is a steady supply of data to the decoder. In the exemplary embodiment of the invention, the router 114 directs alternate Slice records to different logically defined paths. The paths are defined on memory blocks within a buffer area in the memory 120 which is only slightly larger than the maximum VBV buffer size. This arrangement allows consecutive slices to be accessed by the respective variable length decoders (VLD's) 118 and 122 without requiring a separate buffer area (of the maximum VBV buffer size) for each VLD.

Because, as described below, the bit-stream data may only be read from the memory 120 at predetermined times, the bit-stream data is stored in a first-in-first-out (FIFO) buffer memory 116 as it is provided by the router. During the times when bit-stream data is to be written into the memory 120, memory blocks of the data are removed from the FIFO memory 116 and written into the memory 120 under control of the DRAM control and address generation circuitry 126.

After the bit-stream data is written into the memory 120, it is read from the memory 120 and stored either in the buffer memory 121 or the buffer memory 124, also under control of the DRAM control and address generation circuitry 126. Each of the memories 121 and 124 is a FIFO memory which is filled in bursts from the memory 120 and emptied by the respective VLD's 118 and 122 as dictated by the bit-stream syntax. The structure and operation of the VLD's is described below with reference to FIG. 3.

The VLD's 118 and 122 decode the data stream to generate blocks of quantized discrete cosine transform coefficient values. These blocks of values are applied to respective FIFO memories 128 and 130. These FIFO memories buffer the data between the VLD's 118 and 122 on the one hand and the circuitry 132 on the other hand. These memories also perform the inverse scan function. The circuitry 132 performs inverse quantization and inverse discrete cosine transform (IDCT) operations on the data provided by the VLD's 118 and 122. The output data provided by the circuitry 132 are blocks of pixel values or differential pixel values. Where the values in the blocks are differential pixel values, they are combined with values from previously decoded image frames by the add and clip circuitry 158 and 160. These circuits, in turn, obtain the image data from the previously decoded frames, which are provided by the half pixel and interpolation circuitry 166. The interpolation circuitry 166 obtains the image pixels from the previously decoded frames using buffer memories 168. These memories are provided from the memory 120 by the DRAM control and address generation circuitry 126.

One of the VLD's, for example VLD 118 includes a digital phase locked loop (DPLL) which is used to synchronize the system to the 27 MHz clock signal that is defined for the MPEG bit-stream. This circuitry is described below with reference to FIGS. 3 and 4.

The decoded image data produced by the add and clip circuitry 158 and 160 is stored into buffer memories 162 and 164. From the buffer memories 162 and 164 the decoded image data is stored into the memory 120 for display or for use as reference frame data in decoding motion compensated encoded data from later received image fields or frames. Data is stored into this area in block format and transferred to a memory 174 to be provided to a display device (not shown) in raster scan format.

FIG. 2 shows a simplified decoder which may be used when the received signals conform to the main level main profile format. This decoder differs from the decoder shown in FIG. 1 in that it uses only a single decoding channel including VLD 218, inverse quantizer 234, IDCT processor 242 and memories 220, 228, 236, 244, and 250. Because it has only one VLD decoding channel, no router is needed to process the input bit-stream. In addition, because the amount of data that is processed is less than one-fifth of that processed by the system shown in FIG. 1, a smaller main memory may be used. This results in a memory 220 which holds one-sixth of the amount of data held by the memory 120 of FIG. 1. Finally, the internal memory busses leading from the memory 220 to the various elements in the decoder IC shown in FIG. 2 are 64-bit busses compared to the 192-bit busses used in the system shown in FIG. 1. Except for memory size and clock signal frequency, the remainder of the circuitry shown in FIG. 2 is substantially the same as that shown in FIG. 1.

Although not shown, it is contemplated that other circuits may be provided to decode signals corresponding to the different standards. These circuits may for example, employ different amounts of main memory, different clock frequencies and different numbers of bits in their main data bus.

DETAILED DESCRIPTION OF THE EXEMPLARY EMBODIMENTS

FIG. 1 is a block diagram of an exemplary HDTV decoding system, which may be used to decode high definition television signals that have been encoded according to the MPEG-2 standard. The system shown in FIG. 1 does not address some aspects of the high definition television decoding standard, namely the demodulation of the received HDTV signals to recover the digital data stream, the decoding of the transport layer and the processing of the signals provided by the system for display. The circuit 110, shown in FIG. 1 is an MPEG-2 video decoder. It is provided with data values derived from the transport layer as described below.

This decoder, includes two parallel decoding paths, each containing a VLD (118 and 122), an inverse quantization processor (134 and 138) and an inverse discrete cosine transform (IDCT) processor (142 and 146). The two data streams produced by these decoding paths are processed by motion compensation processing circuitry 158, 160 and 166 to produce a single, time multiplexed stream of blocks of decoded pixels. The two decoding read data from, and write data to the memory 120 at several locations.

Figure 3A:
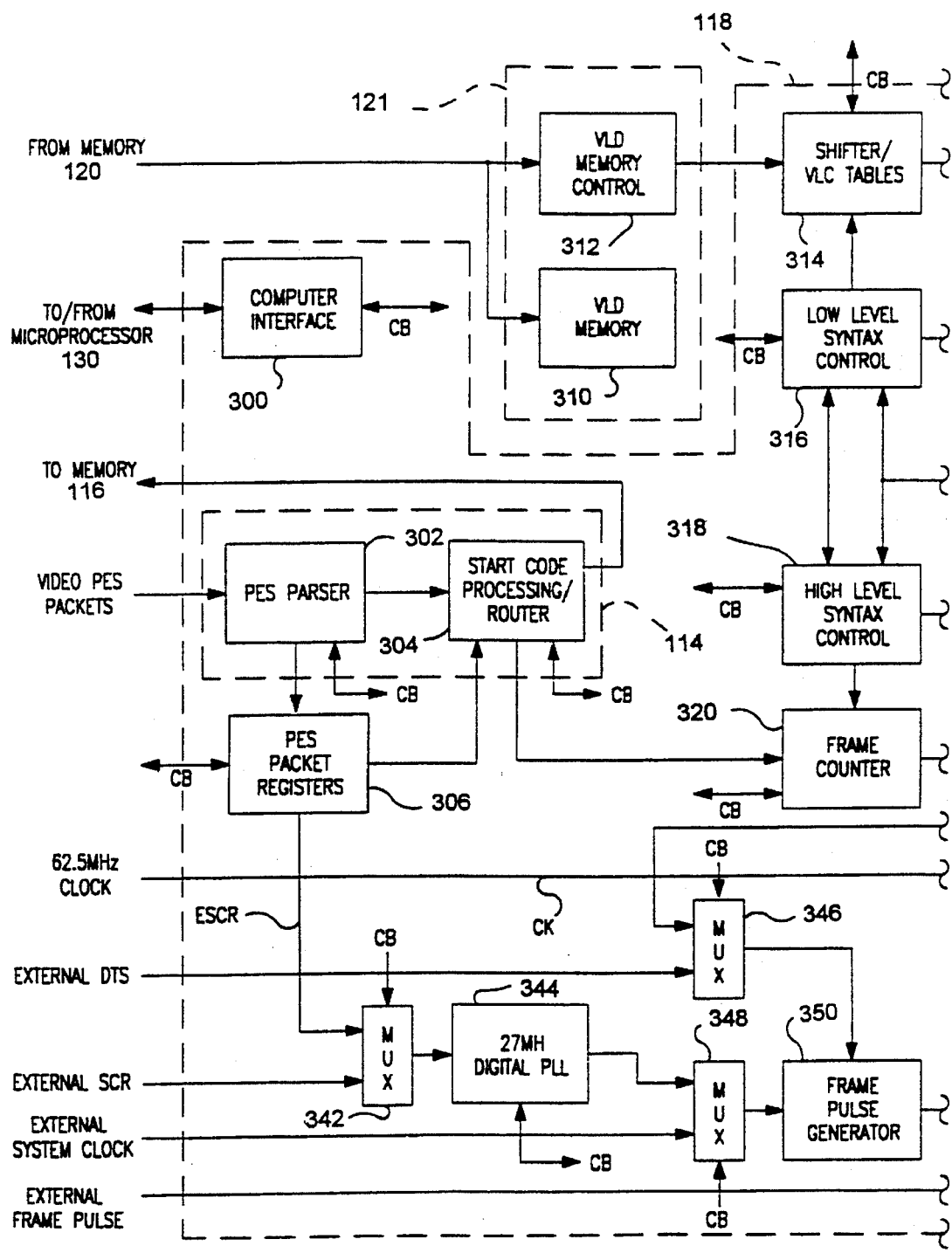
FIG. 3 is a block diagram of a variable length decoder suitable for use in either of the decoders shown in FIGS. 1 and 2.
Figure 3B:
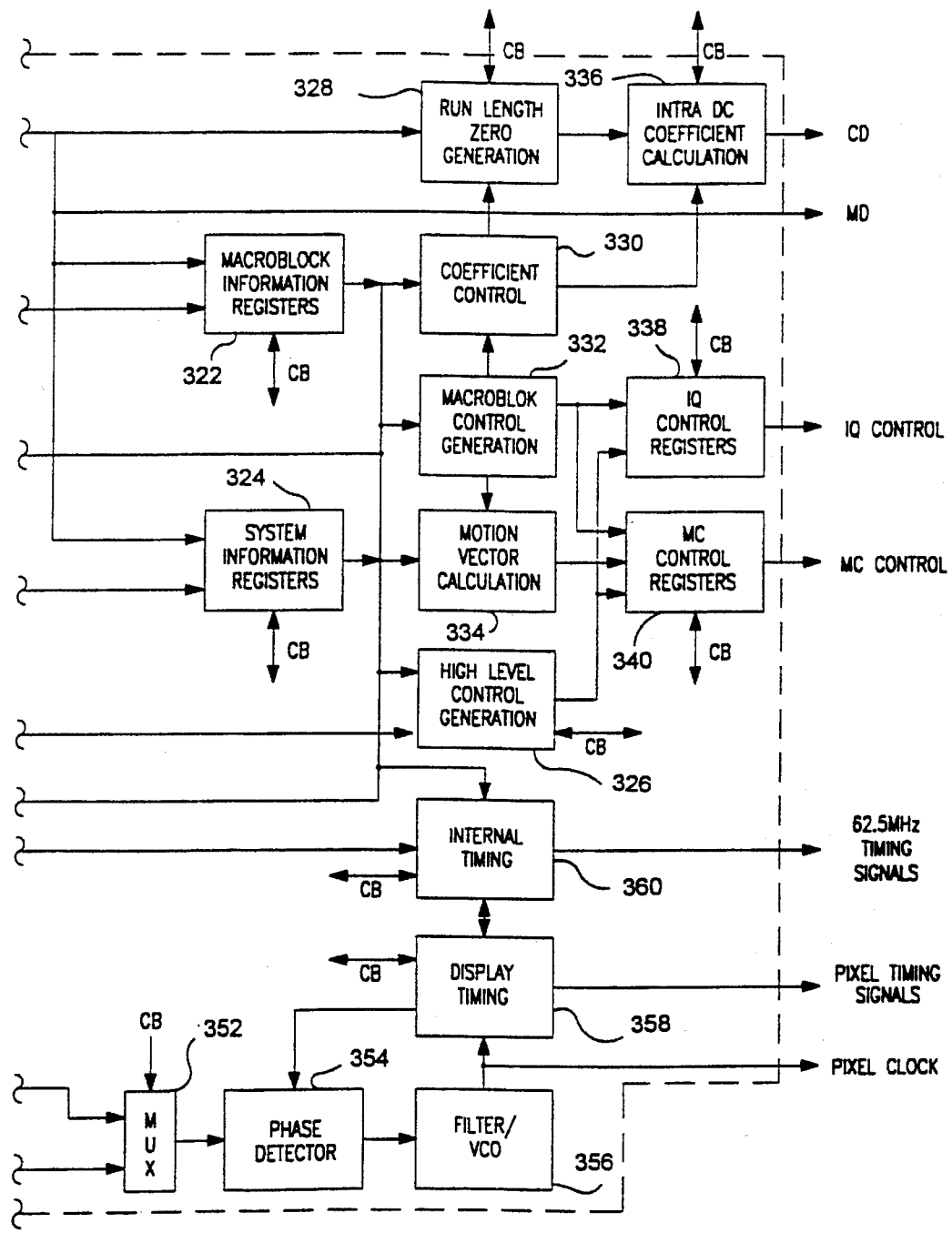

FIG. 3 is a block diagram of the VLD processor 118 and the VLD memory 121. The VLD processor 122 and memory 124 include the same circuitry as that shown in FIG. 3 except that, as described below, portions of this circuitry may be disabled in the VLD processor 122.

As shown in FIGS. 1 and 2, a microprocessor 130 is coupled to the decoder. This microprocessor is used to set values in registers which determine the state of the system. In the system shown in FIG. 1, for example, the values provided by the microprocessor 130 may configure the decoder to handle different types of signals from main profile, main level to main profile, high level. As shown in FIG. 1, the microprocessor 130 is coupled to a microprocessor interface 112 in the decoder. The VLD processor shown in FIG. 3 also includes a computer interface 300 which is used to link the VLD processor to the microprocessor interface 112. This interface coordinates data transfers between the microprocessor 130 and the various elements of the VLD processor. As shown in FIG. 3, a data transfer bus, CB, connects the computer interface 300 to each of the elements of the VLD processor which may be configured or controlled by the microprocessor 130. The data provided by the microprocessor 130 may, in turn, be provided by an external control function (not shown) or by a transport decoder (not shown) which extracts the control information from the transport layer of the MPEG data stream.

One function of the transport decoder is to separate the audio data from the video data. This data is contained in program elementary stream (PES) packets. For transmission, each PES packet is divided among a plurality of fixed-length transport packets. Each transport packet contains data relating to only one PES packet. The transport packet also includes a header which holds control information to be used in decoding the transport packet. Thus, the transport decoder parses and decodes the transport packet header, providing control information to the microprocessor 130 and reassembles the PES packets to provide a sequence of PES packets to the router 114.

In the processor shown in FIG. 3, the router 114 receives PES packets at its input port. APES packet parser 302 internal to the router 114 extracts data from the PES packet headers and reconstructs the bit-stream from the PES packet data. The bit-stream is then passed to start code processing/router circuitry 304. The circuitry 304 recognizes control information (i.e. start codes) in the bit-stream down to the Slice layer and, based on this control information, divides the bit-stream into two logically defined paths. Both of these paths use blocks of memory in a single buffer area, the VBV buffer area, of the memory 120. By dividing the successive slices into separate paths, the router 114 specifies that a block of the VBV buffer area belongs to one or the other of the paths. Data for both paths is stored into a single area of the memory 120. In the exemplary embodiment, the blocks are identified in a table contained in the DRAM control and address generator 126, shown in FIG. 1.

As described above, the encoded video portion of the MPEG-2 data stream includes information at the Sequence layer, Group of Pictures layer and Picture layer which are above the Slice layer in the hierarchy. In the exemplary embodiment of the invention shown in FIG. 1, this information is copied into both paths by the router 114. As described below with reference to FIG. 3, this information is processed by each of the VLD processors 118 and 122 to generate the control values for the respective decoders. Alternatively, it is contemplated that one of the VLD processors 118 and 122 may be configured as a master VLD processor which controls the other VLD processor. In this configuration, only the master VLD processor would receive the control values from the Sequence, Group of Pictures, and Picture layers. This master decoder would pass any needed information to the slave decoder In the system shown in FIG. 1, the data in the blocks of memory of one path are processed by the VLD processor 118 while the data in the blocks in the other path are processed by the VLD processor 122. Since both of the VLD processors 118 and 122 perform the same video decoding functions, only one, VLD 118 is described in detail with reference to FIG. 3.

Referring to FIG. 3, as the VLD processor removes bit-stream data from the buffer memory 121, more data is provided via memory access requests to the memory 120. In the exemplary embodiment of the invention, the memory 121, which buffers the bit-stream data fetched from the memory 120, includes a memory section 310 and a memory control section 312. The memory control section 312 monitors the fullness of the memory 310 and requests additional data from the memory 120 when sufficient space exists in the memory section 310 to hold the data fetched from the memory 120.

For the sake of simplicity, it is assumed that the video signals being decoded by the exemplary decoder are formatted such that each Slice includes a number of macroblocks sufficient to span the width of the reproduced image. Thus, each of the decoding channels processes horizontal stripe of the image. In an actual signal, slices may be shorter than one picture width and, so, may vary in the number of pixels that they represent. These signals may be decoded by the decoders shown in FIGS. 1 and 2 without producing any artifacts.

In the exemplary embodiment of the invention, data is stored into and fetched from the memory 120 in units of "rows". A row includes 6,144 (6K) bytes of data. The memory 120 shown in FIG. 1 is actually three memories arranged in parallel. Each of these memories can provide a row of 2,048 (2K) bytes of data in response to a single request. As described below, although all three rows are read and written simultaneously, separate addresses may be specified for each of the three memories.

In the system shown in FIGS. 1 and 3, the memory 121 may be loaded with as many as three accesses of 6,144 bits each for a total of 18,432 bits of the bit-stream data as soon as sufficient data has been stored in the memory 120 to start the decoder (i.e. as soon as the VBV buffer size criterion has been met). After this initial transfer, data is accessed as it is needed by the memory 121. Thus, the VLD memory 121 may store as much as 6,144 bits of bit-stream data each time that it fetches data from the memory 120. As described above, the VLD memory 121 fetches blocks of the bit-stream from one path and while the memory 124 (shown in FIG. 1) fetches blocks from the other path. The memory control circuitry 312 in each of the memories 121 and 124, shown in FIG. 3, controls respective memory elements 310 in such that data is provided by the memories 310 of the buffer memories 121 and 124 to the respective decoders 118 and 122 as needed.

Referring to FIG. 3, the bit-stream provided from the memory 312 is applied to a shifter 314 which uses various variable length code (VLC) tables to change the variable length coded data from the bit-stream into fixed-length code values. The shifter 314 provides data values to, and receives control information from a low-level syntax control circuit 316 and a high-level syntax control circuit 318. These control circuits monitor the bit-stream syntax to determine which VLC table is to be used to decode the bit-stream data and which data is to be decoded. The operation of these decoders follows the MPEG-2 video data syntax set forth in the above-referenced draft internal standard. In general, the high level syntax controller 318 governs the operation of the shifter 314 in decoding the Sequence, Group of Pictures and Picture layers while the low level controller 316 governs the shifter in decoding the Slice and Macroblock layers.

The shifter 314 provides fixed-length code values to macroblock information registers 322, system information registers 324 and run-length zero generation circuitry 328. The values provided to the registers 322 and 324 are control values which are extracted from the sequence header, group of pictures header, picture header and Slice header. These values are used, for example, to control the decoding of macroblocks of coefficient data, to control the generation of motion vectors and to control the decoding of the inverse quantization matrices.

The run-length zero generation circuitry 328 expands code values representing groups of zero-valued coefficients into the specified number of zeros. The coefficient control circuitry 330 uses information contained in the macroblock information registers 322, in the system information registers 324 and information provided by the low-level and high-level syntax control circuits to control the operation of the run-length zero generation circuitry 328 and the intra DC coefficient calculation circuitry 336.

Macroblock control generation circuitry 332 extracts and combines data from the macroblock information registers 322 and system information registers 324 at times indicated by the low-level syntax control circuitry 322 to generate information which is used by the coefficient control circuitry 330 in the decoding of the quantized discrete cosine transform (DCT) coefficients. The circuitry 332 also provides information which is used by the motion vector calculation circuitry 334 to regenerate the motion vectors that were used in the portions of the image which are encoded using motion compensated encoding techniques. As described in the above-referenced MPEG-2 Draft Internal Standard, motion vector information is distributed at many layers of the MPEG-2 syntax. Accordingly, the motion vector calculation circuitry 334 also uses data from the macroblock information registers 322 and system information registers 324 directly to produce values which are stored in the motion compensation control registers 340.

Other information which is produced by the macroblock control generation circuitry 332 is stored in the inverse quantization control registers 338 and the motion compensation control registers 340. Information to be stored in the registers 338 and 340 is also provided by the high level control generation circuitry 326 which consolidates data from the macroblock information registers 322, system information registers 324 and frame counter 320 at times indicated by the high-level syntax control circuitry 318.

The decoder shown in FIG. 3 provides four output signals containing decoded data: a coefficient data signal, CD; a quantization matrix data signal, MD; an inverse quantization control signal, IQ Control; and a motion compensation control signal MC Control. The signal CD conveys coefficient data while the signals IQ Control and MC Control convey information on the inverse quantization operation and the motion compensation processing, respectively. The signals CD and IQ Control are applied to the IDCT processor 142 and the inverse quantization processor 134, shown in FIG. 1, to aid in the conversion of the coefficient data to corresponding blocks of pixel data. The signal MC Control is applied to the half-pixel and interpolate circuitry 166, as described below, to control the motion compensation processing of any decoded pixel difference data provided by the IDCT circuitry 142. The same signals are provided by the VLD 122 to control the operation of the inverse quantization circuitry 138, the IDCT processor 146 and to control the motion compensation processing of the blocks of differentially encoded pixel values provided by these circuits.

The decoder shown in FIG. 3 also includes circuitry which generates the system clock signals that are used to decode the MPEG encoded image data. Briefly, this circuit includes a digital phase-locked loop (DPLL) which is preset to oscillate at a frequency which closely approximates the 27 MHz system clock signal specified in the MPEG-2 standard. This DPLL can be instantaneously synchronized in phase to the system clock signal responsive to one of two system clock references, either the System Clock References (i.e. the SCR values defined in the standard) or the Elementary System Clock Reference (i.e. the ESCR values defined in the standard). Although both of these values may be received in the input data stream, only one set of values is used to synchronize the clock signals. In addition to this instantaneous phase synchronization, the frequency of the DPLL may be changed, responsive to several clock reference values (either SCR or ESCR), to match the frequency of the system clock to that specified in the encoded data stream.

Referring to FIG. 3, the central component in the clock generation circuitry is the 27 MHz DPLL circuit 344. This circuit receives a reference value from a multiplexer 342 which is coupled to receive an externally supplied SCR at one input port and to receive an ESCR, extracted from a PES packet header, at its other input port. The ESCR is provided by the PES packet parser 302, described above, to PES packet registers 306. The ESCR is provided by the registers 306 to the multiplexer 342, as it is received. The SCR and ESCR values are count values of the 27 MHz clock signal. These values are in units of one period of the 27 MHz signal. Each value represents the instant in time at which the encoded SCR or ESCR is received. Responsive to a control signal provided by the microprocessor 130 via the bus CB, the multiplexer 342 applies either the SCR values or the ESCR values to the DPLL 344.

Figure 4:
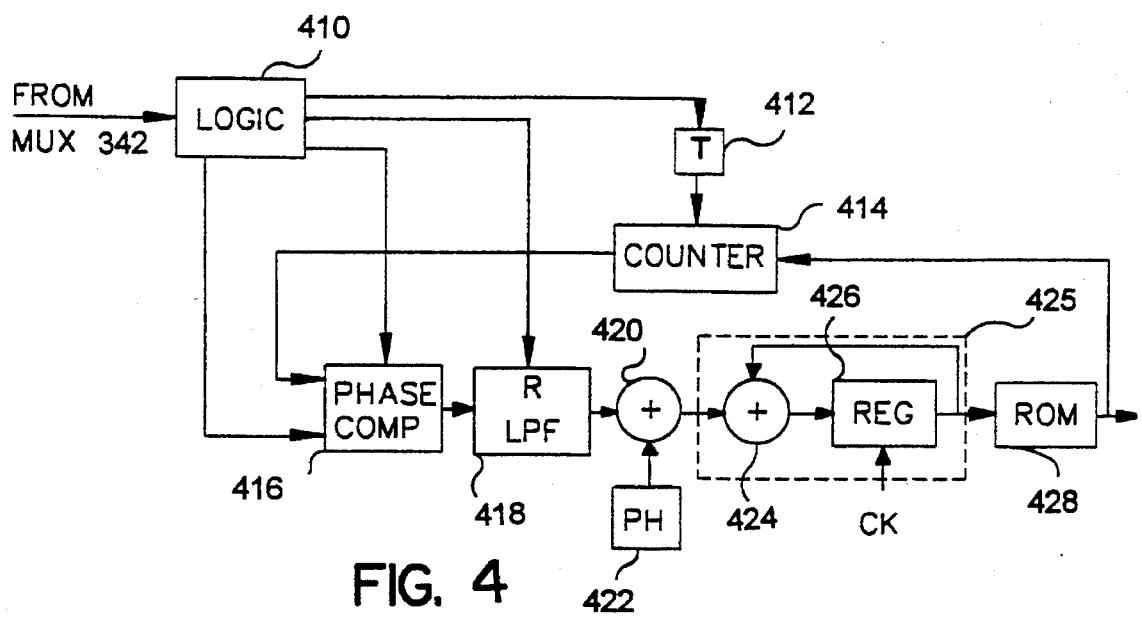
FIG. 4 is block diagram of a digital phase-locked loop suitable for use in the variable length decoder shown in FIG. 3.

Circuitry suitable for use as the DPLL 344 is shown in FIG. 4. The central element of this circuitry is a discrete time oscillator (DTO) 425 which includes an accumulator register 426 and an adder 424. The register 426 is configured to load the output value provided by the adder responsive to a clock signal CK. In the exemplary embodiment of the invention, this clock signal has a frequency of 62.5 MHz. The value held in the register 426 is applied to one input port of the adder 424 and a phase value is applied to the other input port. The phase value is accumulated at each successive clock pulse until the adder overflows, at which point the phase value is added to the residue of the overflow. The output signal provided by this circuit is the digital value held in the register 426. This value defines a quantized sawtooth waveform which rises with each phase accumulation and falls when the adder 424 overflows. This output signal is applied to the address input port of a read-only memory ROM 428 which, in this embodiment, converts the quantized waveform into a square wave having a value of logic-one or logic-zero. This square wave is applied to the input port of a counter 414.

The phase value applied to the DTO 425 is the sum of a constant value PH, provided by a source of constant value 422, and a changing value which is provided by a low-pass filter 418, the loop-filter of the DPLL 344. In the exemplary embodiment of the invention, the value PH is chosen to cause the quantized sawtooth signal provided by the DTO and thus, the square wave signal provided by the ROM 428, to have a frequency of 27 MHz The accuracy of this frequency depends, in part, on the modulus of the adder 424. It is desirable, therefore, for the adder to have a relatively high modulus (i.e. to have a relatively large number of bits in its input and output values). The output signal of the low-pass filter 418 is used to adjust the frequency of the DTO 425 to more closely match the 27 MHz system clock signal defined in the MPEG-2 bit-stream.

One method by which this clock frequency is defined in the bit-stream is with reference to the System Clock Reference (SCR) or Elementary System Clock Reference (ESCR) values which are contained in the bit-stream. The ESCR values are contained in the PES packet headers of the elementary data streams which constitute the transport stream and the SCR values are contained in headers which are imbedded in the video data bit-stream that is regenerated from the PES packets. In the exemplary embodiment of the invention, either the SCR values or the ESCR values—but not both—are used to synchronize the clock signal.

In the exemplary embodiment, the clock reference values are received from the multiplexer 342 by logic circuitry 410. When the logic circuitry 410 determines that a new reference value has been received, it routes the reference value to the phase comparator 416 and enables the phase comparator, allowing it to produce a new phase difference signal for the DPLL circuit. This phase difference signal is integrated by the low-pass filter 418 to generate the phase-change signal for the DTO 425. In the exemplary embodiment, the phase comparator may include a subtracter (not shown) which subtracts the provided SCR or ESCR from the value held in the counter 414 and then scales the difference by some loop gain factor. This scaling may be implemented, for example, as a hard-wired shift operation which shifts the bits in the result to less significant bit positions.

After the scaled phase difference value has been calculated, the logic circuitry optionally replaces the value held by the counter 414 with the SCR or ESCR reference value. As described above, this counter holds a count of the 27 MHz clock pulses generated by the DPLL circuitry. This counter value is also compared to the presentation time stamp values contained in the picture headers to determine when frames of data are to be displayed.

The logic circuit 410 may also reset the phase comparator and low pass filter at certain times such as during initial power-up and when a new clock signal is indicated, such as when a new broadcast channel has been selected or at other times when the source of the data changes, such as at a signal splice point.

In operation, the phase value provided by the source 422 causes the DPLL 344 to have a free-running frequency which closely approximates the 27 MHz system clock frequency. Thus, when the register 426 is preset with the first clock reference value, the clock signal and count values produced by the DPLL are aligned in phase—although not necessarily in frequency—with the reference clock signal defined by the bit-stream. Due to the selection of the phase value provided by source 422, however, the DPLL 344 has a relatively small error in frequency and, so, may be used immediately to decode the MPEG-2 encoded image. This is an advantage of this implementation over a more conventional system in which an analog phase locked loop (PLL) may be locked, for example, to the external 27 MHz system clock signal provided by the transport decoder. In this conventional system, the decoder may not be able to start decoding until the PLL has reached a locked state while a system built according to this aspect of the present invention may start decoding as soon as the first SCR or ESCR value is received.

As shown in FIG. 3, the VLD processor 118 generates several timing and control signals in addition to the 27 MHz clock signal. The counter value provided by the DPLL 344 is applied to one input port of a multiplexer 348 and an external counter value derived from an external 27 MHz clock signal is applied to another input port of the multiplexer 348. This external 27 MHz clock signal may be derived, for example, by the transport decoder from the transport packets. The multiplexer 348 provides one of these signals as the 27 MHz clock signal to the frame pulse generator 350. The selection of which clock signal to provide is made responsive to the signal CB provided by the microprocessor 130.

The frame pulse generator 350 is also responsive to a decoding time-stamp (DTS) value which may be provided from the transport decoder or from the system information registers 324 and high-level syntax control circuitry 318. When this DTS value matches the counter value provided by the multiplexer 348, the circuitry 350 generates a frame pulse. This pulse is applied to one input port of a multiplexer 352, the other input port of which is coupled to receive an external frame pulse. The multiplexer 352 is controlled by the microprocessor 130 via the control bus CB.

The frame pulse represents the time at which a new image frame is to be decoded and displayed by the HDTV receiver. This pulse is applied to a phase detector of a conventional analog PLL 356 which uses the frame pulse to generate a display pixel clock signal and various other display timing signals such as vertical and horizontal synchronization signals for the display device (not shown). The phase detector 354 compares the externally generated frame pulse to a frame pulse that is generated by counting-down the pixel clock signal. The result is filtered in the loop filter portion (not separately shown) of the filter/VCO 356 and used to control the frequency and phase of its associated VCO (not separately shown) so that the counted-down frame pulse occurs substantially coincident with the pulse provided by the multiplexer 352.

Although not shown, it is contemplated that the logic circuitry 410 of the DPLL 344 may be used to reset the PLL formed by the phase detector 354 and filter/VCO 356 at initial power-on or when it detects a change in the source of the video signal or some other event which may change the pixel clock frequency.

In addition to the pixel clock signal and pixel timing signals, the display timing circuitry 358 exchanges timing information with internal timing circuitry 360. The circuitry 360 generates timing signals which are used to synchronize at least that portion of the circuit which is responsive to the 62.5 MHz clock signal CK. In addition, the circuitry 360 may be used to generate other clock signals, for example, the 50 MHz clock signal used by the inverse quantization and IDCT circuitry 132.

Referring to FIG. 1, the coefficient data stream CD provided by the VLC processor 118 conveys blocks of quantized discrete cosine transform (DCT) coefficients to the memory 128. This memory acts as a first-in-first-out (FIFO) buffer between the VLD processor 118 and the inverse quantization processor 134 and is also used to transform each block of quantized coefficient values provided by the VLD processor 118 into a stream of values representing an inverse zigzag scan of the block. The processor 134 then dequantizes the values. The dequantization operation is described in section 7.4 of the draft internal standard ISO/IEC 13818-2, entitled Generic Coding of Moving Pictures and Associated Audio which is incorporated by reference for its teachings on the decoding of MPEG-2 encoded video signals.

The inverse quantization operation may use a preset quantization matrix which is defined for the MPEG-2 standard or it may use a special quantization matrix which is provided in the sequence header. As defined in the MPEG-2 standard, different quantization matrices may be used for intra-frame encoded data and motion compensated data. In addition, the quantization matrix may be scaled before it is applied to the macroblocks in a Slice. This scaling is performed in response to data provided in the Slice header which includes the macroblocks. The quantization matrices used by the circuitry 134 are stored in the memory 136.

After the inverse quantization operation, the dequantized coefficient values are applied to the IDCT processor 142 which performs the inverse discrete cosine transform operation. This operation recovers a stream of pixel values or pixel difference values corresponding to the stream which is processed by the inverse quantization circuitry 134. The IDCT processor 142 implements the inverse discrete transform operation described in section 7.5 of the above-referenced MPEG-2 standard. In performing this operation, the processor 142 uses the memory 144 as a working storage.

The stream of pixel or pixel difference values resulting from the IDCT operation are applied to a memory 150. This memory acts as a FIFO buffer and is also used to convert the block scan format into a special macroblock format used by the motion compensation processing circuitry. The macroblocks of pixel values provided by the memories 150 and 152 are applied to motion compensation circuitry via the multiplexers 154 and 156. Each of these multiplexers receives respectively different parts of the macroblocks provided by the memories 150 and 152. The multiplexer 154 receives the upper eight lines of each of the 16-line by 16-pixel luminance components of the macroblocks and the upper four lines of each 8-line by 8-pixel chrominance (UV) component of the macroblock. The multiplexer 156 receives the lower eight lines of the luminance component and the lower four lines of each of the chrominance components of each of the macroblocks.

As described in the above-referenced MPEG-2 standard, when the macroblocks contain pixel difference values they also include motion vector information. This motion vector information is decoded by the variable length decoders 118 and 122 and is queued for use by the half pixel and interpolation circuitry 166 and the DRAM control and address generation circuity 126.

The half pixel interpolation circuitry 166 uses motion vector information and motion compensation control information provided by the variable length decoders 118 and 122 to generate pixel values, either directly from the data values held in the memory 120 or interpolated at half-pixel positions between adjacent ones of these data values. The circuitry 166 also performs B-frame interpolation. Each of the four memories labeled 168 is loaded with a 9-line by 17-pixel luminance data block and two 5-line by 9-pixel chrominance data blocks. These blocks are fetched from the memory 120 at locations determined by the location of the block being decoded and its associated motion vector information. Two of the memories 168 are loaded with forward prediction data from the memory 120 whereby one of these two memories 168 is loaded with the upper part of a macroblock and the other is loaded with the lower part of a macroblock. Likewise, the other two memories 168 are loaded with backward prediction data for use in the B-frame interpolation.

The 17 by 9 pixel luminance data block and the 9 by 5 pixel chrominance data blocks for the respective U and V signals each includes an extra row and extra column of pixels compared to the 8 by 16 luminance half-macroblock and two 4 by 8 U and V chrominance data blocks with which they are combined by the motion compensation circuitry. The extra line and extra pixel are used to generate data blocks which are shifted in pixel position by one half pixel, horizontally, vertically or diagonally. As an example of the horizontal interpolation, each of the first 16 horizontal pixels is averaged with the next adjacent pixel to create 16 resultant "half-pixels," each representing a pixel position between the two pixel values that were averaged. Input pixel one is averaged with input pixel two to create output pixel one; input pixel two is averaged with input pixel three to create output pixel two and so on until input pixels 16 and 17 are averaged to create output pixel 16. The vertical interpolation proceeds in the same manner by averaging vertically adjacent pixels in the data block. The diagonal half-pixels are produced by combining horizontal interpolation and vertical interpolation.

Responsive to the motion vector information, the half pixel interpolation operations described above generate four complete half-macroblocks of pixel data. Again, responsive to the motion vector data, the B-frame interpolation section of the circuitry 166 may average the forward prediction half-macroblocks with the appropriate pixels from the backward prediction half-macroblocks to create two half-macroblocks.

The half-macroblocks generated by the circuitry 166 are combined with respective half-macroblocks of differential pixel values provided by the multiplexers 154 and 156 using the add and clip circuits 158 and 160. These circuits sum nine-bit pixel values, provided by the multiplexers 154 and 156, with eight-bit pixel values, provided by the circuitry 166, to produce an eight-bit result. These pixel values are written into respective buffer memories 162 and 164, from which they are stored into the memory 120 to form fields of decoded image pixel values. In the exemplary embodiment of the invention, the data in the memories 162 and 164 may be transferred one macroblock at a time to the memory 120. As described below, in the exemplary embodiment of the invention, it is assumed that the data is written one macroblock at a time from the memories 162 and 164 into the main memory 120.

Once the image data is stored in the memory 120 it may be accessed as reference frame data (i.e. anchor frame data) for decoding later-provided differentially encoded image data or it may be accessed to be displayed on a display device (not shown). In the exemplary embodiment of the invention, pixel data representing individual lines of the reproduced image are accessed from the memory 120 for display using a memory 174 and a display controller 175. The display controller 175 is responsive to signals provided by the VLD processors 118 and 122 to access data held in the memory 120 at times indicated by the presentation time stamp values of the picture headers and to reformat the data for display in raster-scan order. As shown in FIG. 1, the memory 174 is responsive to a display clock signal which may be provided from an external display device or may be generated, as described above in the VLD processor 118. In the exemplary embodiment of the invention, the pixel data is not accessed in macroblocks for display. Instead, lines of data from consecutive rows of the memory 120 are accessed. These lines are concatenated to form data representing a line of the displayed image.

Various types of data are stored in the memory 120. In the exemplary embodiment of the invention, the memory 120 holds the MPEG-2 encoded bit-stream, two anchor frames, the frame being decoded and at least a portion of the frame that is being displayed. Even with the wide-bandwidth and concomitant high transfer rate of the RAMBUS memory 120, it is desirable to control the writing into and reading from the memory to ensure that data held in the memory can be fetched from the memory when it is needed and written into the memory as needed, without delay.

As shown in FIG. 1, the memory 120 is divided into three channels, each of which is connected to a respectively different RAMBUS application specific integrated circuit (ASIC) cell (RAC) 172. The RAC's 172, in turn, are coupled to a RAMBUS ASIC cell (RAC) interface 170. The RAC interface 170 provides 192 parallel bits of data to, and receives 192 parallel bits of data from the various elements of the decoder circuit via a single memory port as described above. The bus between the RAC's 172 and the memory 120 is a bidirectional bus having a clock rate of 250 MHz. In the exemplary embodiment of the invention, this memory port is expanded internal to the decoder IC 110 to include separate input and output busses. It is contemplated, however, that at least at the lower levels of the MPEG standard, a single bidirectional memory bus could be used for the internal memory bus.

Figure 5:
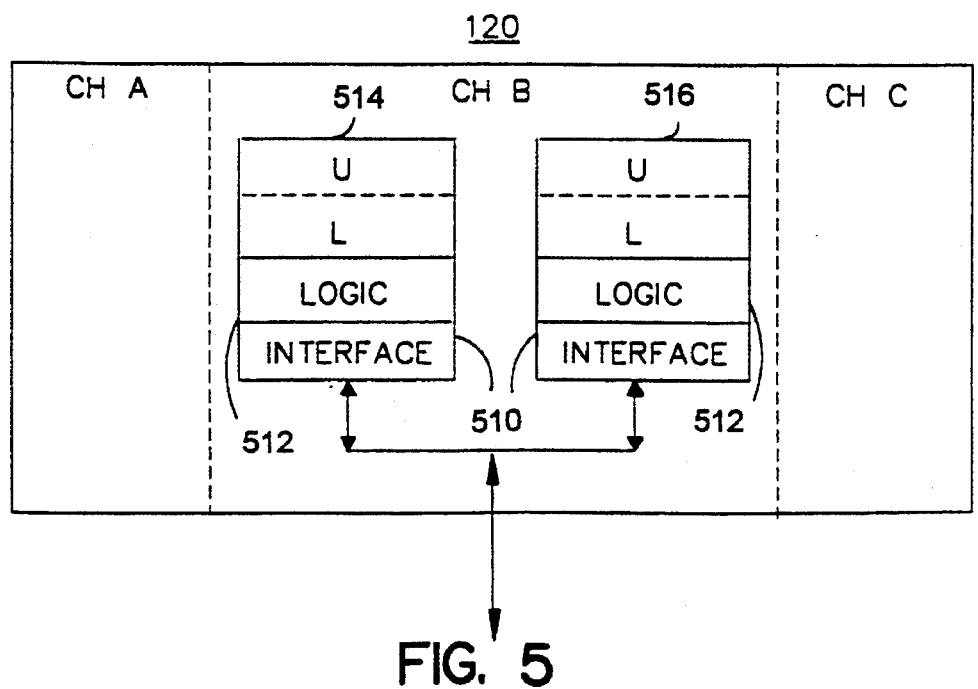
FIG. 5 is block diagram of a high-bandwidth memory suitable for use in the decoders shown in FIGS. 1 and 2.

FIG. 5 is a block diagram which shows the structure of the memory 120 with details of one of the channels (channel B). As shown, each channel (A, B and C) includes two memory devices, 514 and 516 which hold the actual data. Each memory device, in turn, is divided into two banks, an upper bank (U) and a lower bank (n). The data in each of the channels is arranged in rows and an entire row is accessed at once by logic circuitry 512. A row of data is accessed from a single bank of a single device. Thus, each channel contains four rows with the same row number. These rows are differentiated by which bank of which device is used to access the row of data. The logic circuitry 512 selects the proper device and bank to be used for a particular memory access and provides data to, or receives data from the interface circuitry 510. The interface circuitry mirrors the ASIC cells shown in FIG. 1, according to the protocol defined for transferring data to and from the memory devices 514 and 516. For each channel a "row" includes 2,048 bytes of data. Consequently, for the three channels of the memory 120, a row includes 6,144 bytes of data. The transfer from the interface 510 to the RAC's 172 (shown in FIG. 1) occurs at 250 MHz via the bidirectional memory port with one byte of data being transferred in each channel coincident with each edge of the 250 MHz clock signal. Thus eight bytes (one octbyte) of data are transferred in each period of the 62.5 MHz clock signal.

Figure 6A:
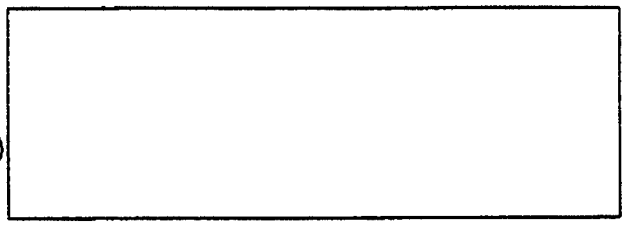
FIGS. 6a, 6b and 6c data structure diagrams which are useful for describing the mapping of images into the memory shown in FIG. 5.
Figure 6B:
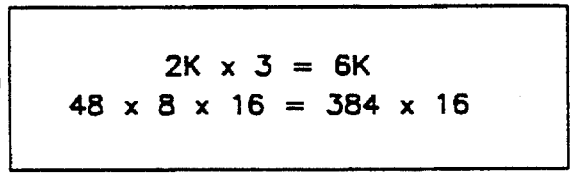
Figure 6C:
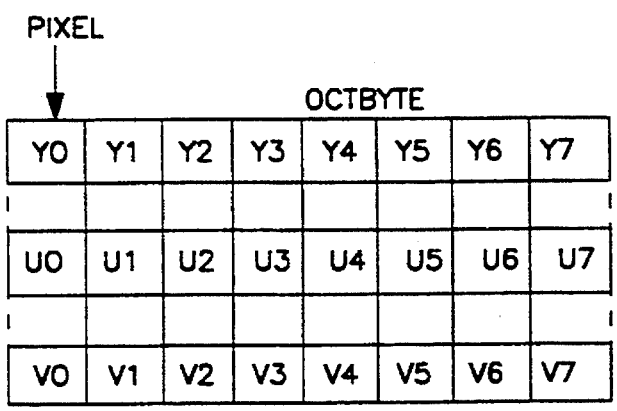

FIGS. 6a, 6b and 6c are data structure diagrams which are useful for describing how a field of image data is stored in the memory 120. FIG. 6a shows an image field for a main profile high level image. This image field includes 540 lines, each line having 1920 pixels. As described above, the rows of data provided by the memory 120 are fixed in length. Accordingly, a Slice of macroblocks, that spans the width of the image, uses eight rows, each row, as shown in FIG. 6b, includes 6,144 bytes of data, arranged in a matrix of 384 bytes horizontally by 16 lines vertically. As described above, the memory 120 provides data in units of eight bytes (one octbyte). FIG. 6c is a data diagram which shows one octbyte of data for the luminance signal (Y) and for each of two color difference signals (U and V).

Figure 7:
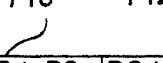
FIG. 7 is a data structure diagram which is useful for describing the mapping of an image field for storage into the memory shown in FIG. 5.

FIG. 7 is a memory map diagram which shows how the rows which constitute one image field of data are stored in the memory 120. As shown in FIG. 7, the rows of macroblocks are identified by their device number (D0 or D1) their bank within the device (L or U) and their row number within the bank (R0 through R67). The next image field would begin at memory row R68.

It is noted that the device assignment for the rows alternates down the columns of the stored image. The successive memory rows in the first column of the data structure follow the sequence D0, D1, D0, etc. This vertical interleaving of the memory rows in the different devices allows pairs of vertically aligned rows to be accessed at greater speed than if the rows were stored in the same device. This feature of the RAMBUS system is described in greater detail below with reference to FIGS. 11a and 11b.

Figures 8A, 8B, 8C:
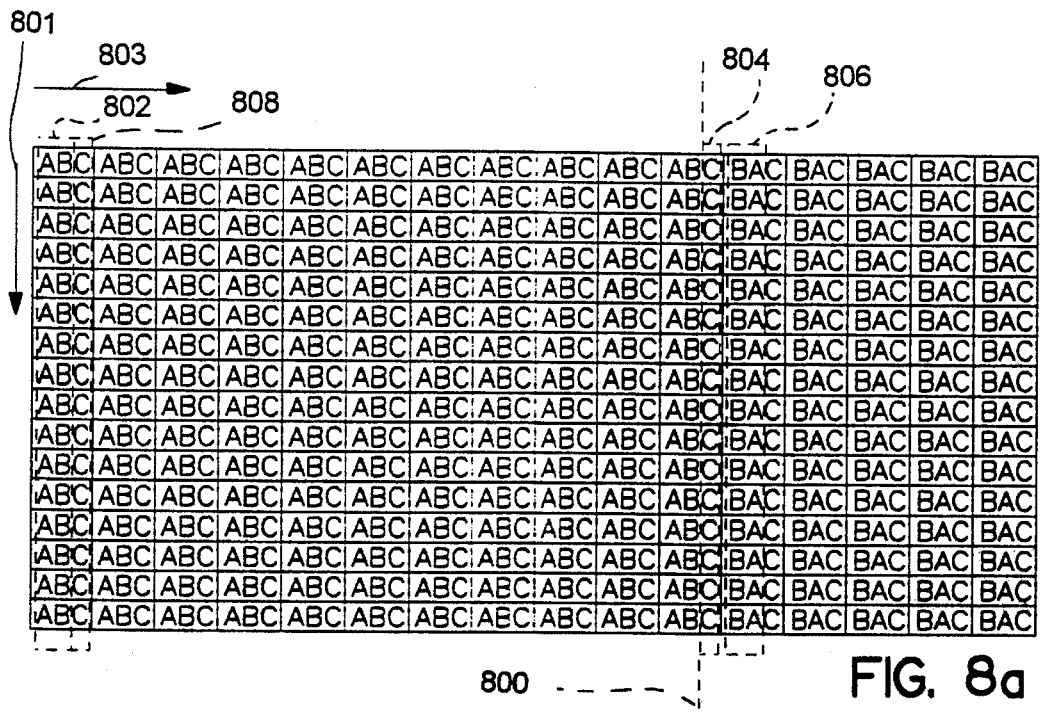
FIGS. 8a, 8b and 8c are data structure diagrams which are useful for describing the memory mapping used to store rows of pixel values into the memory shown in FIG. 5.

As defined in the MPEG-2 specification, each macroblock includes six blocks, four 8-pixel by 8-line blocks of the luminance information signal, Y, and one 8-pixel by 8-line block of each of the two chrominance information signals, U and V. FIGS. 8a, 8b and 8c show a mapping of image pixels into rows which is advantageous for use in the present invention. FIG. 8a shows a first memory row of pixel data, row 1, for an image field as it is stored in the memory 120. FIGS. 8b and 8c each show one-half of memory rows 2 and 3 which contain pixel information that is horizontally adjacent to the pixel data of row 1 in the field. The rows of memory shown in FIGS. 8a, 8b and 8c are divided into two sections. The sections to the left of the dashed vertical line 800 hold the luminance data and the sections to the right of the line 800 hold the chrominance information. Each of the letters, A, B and C represents an octbyte of data obtained from a respective one of the three channels of the memory 120. Thus, the row of memory shown in FIG. 8a includes 16 lines, each containing 48 octbytes. In the exemplary embodiment of the invention, all three of the channels are used during each memory access operation. When a macroblock of data is being stored into the memory 120 from the memories 162 and 164, two channels are used for luminance information (two octbytes per 62.5 MHz clock pulse) and one channel is used for chrominance information (one octbyte per 62.5 MHz clock, alternating U and V). When data is being fetched for use by the half-pixel interpolator 166, and when data is being retrieved for display, all three channels are used first to fetch luminance information and then to fetch chrominance information.

Data is both written into the memory 120 and read from the memory for use by the half-pixel interpolator such that successive octbytes are accessed in the direction indicated by the arrow 801. Data is read from the memory for display, however, such that successive octbytes are obtained in the direction indicated by the arrow 803. For the memory operations indicated by the arrow 801, the addresses for the octbytes are successive and addresses after the first address need not be specified. For the memory read operations indicated by the arrow 803, however, a separate address is specified for each fetched group of three octbytes from the three channels. In the exemplary embodiment of the invention, these addresses are fetched using a serial address line (not separately shown) which is defined for the RAMBUS system. The speed at which a block of data in a single memory row may be accessed is the same for sequential access or for random access using the serial address line.

Figures 9, 10:
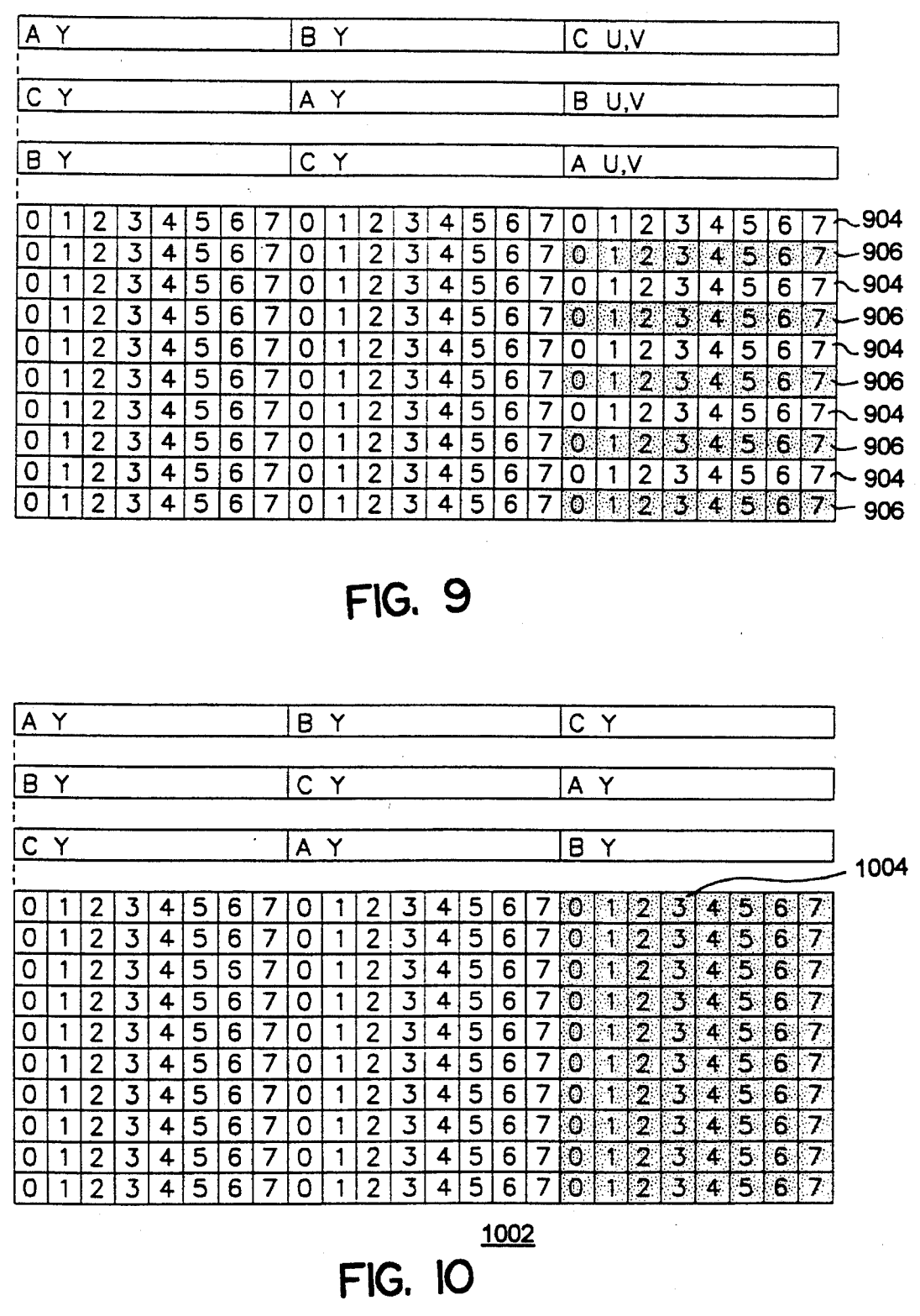

It is noted that the luminance information (designated as Y) and chrominance information (designated as UV) is written concurrently into the channels A, B and C of the memory 120 in the order Y-(A,B), UV-(C); Y-(C,A), UV-(B); Y-(B,C), UV-(A). as illustrated in FIG. 9. As shown in FIG. 8a, the Y data is written to the left of dashed line 800 while the corresponding UV data is written to the right of dashed line 800. As shown in FIG. 9, the U chrominance information 904 is vertically interleaved with the V chrominance information 906. The luminance component of each successive horizontal macroblock occupies two complete columns of a first memory row, shown in FIG. 8a, while the chrominance information occupies one complete column. The luminance components are written starting from the left edge of FIG. 8a and the chrominance components, starting from the dashed line 800. This pattern continues until luminance information is written into the column which is adjacent to the line 800 on the left and the corresponding chrominance information is written into the right-most column of FIG. 8a. The next macroblock is written in a second row of the memory 120 which is shown in FIG. 8b. The data in this second memory row continues the ordering described above such that the last luminance data in the first memory row—written into the memory using channels (A,B)—is followed by luminance data written into the memory 120 using channels (C,A) in the second memory row. The data is written in this pattern so that luminance and chrominance data is continuous across memory row boundaries.

FIG. 7 shows one complete field where each cell is a memory row as shown in FIG. 8a. A horizontal macroblock row (16 lines of a video image) uses eight memory rows as shown in FIG. 7. The data ordering method described above provides data continuity across the memory rows shown in FIG. 7. The primary importance of this ordering is to allow reference macroblocks to be easily accessed. As defined in the standard, these reference macroblocks are offset from the current input macroblock by respective motion vectors which define arbitrary vertical and horizontal displacements, each with one-half pixel resolution. The implication of this is that the position of a reference macroblock is not confined to the cell lines of FIGS. 7 or 8a through 8c.

The particular arrangement of data shown in FIGS. 8a, 8b and 8c allows the storage of a newly decoded luminance-chrominance macroblock using only a single memory access request and it also allows arbitrarily positioned blocks of luminance pixels in 17 by 9 format and chrominance pixels in 9 by 5 format to be accessed for motion compensation processing using, at most, two memory access. Furthermore, these two requests may be pipelined.

Memory 120 is read for display, and data is stored in display memory 174 under control of display controller 175. With reference to FIG. 7, a field is generally read from left to right and top to bottom. All three memory channels are used. In the discussion that follows, FIG. 8a represents the memory row 710 in the upper left-hand corner of FIG. 7 and FIG. 8b represents the memory row 712 positioned to the right of row 710. In one access, the first line of FIG. 8a is read from left to right in the direction of arrow 803. Note that all of the Y values are read first, followed by the U and V values. The next access is made from the second memory row 712, as shown in FIG. 8b. Within FIG. 8b, the first line is read from left to right. This continues such that a display raster is formed. Note that the ordering of the data among the three channels is different for each of the three rows shown in FIGS. 8a, 8b and 8c. This pattern repeats every three rows. When display memory 174 is read under direction of display controller 175, the data is reordered for correct display by combining corresponding luminance and chrominance components.

As described above, the half-pixel interpolator always accesses luminance data to obtain blocks that are 17 pixels by 9 lines and accesses chrominance data in two blocks—one for the U values and one for the V values that are each 9 pixels by 5 lines. FIG. 10 illustrates how the memory is accessed to obtain the 17 by 9 block of luminance pixels.

To access 17 consecutive pixel values, data from three channels is needed. FIG. 10 shows that the data can have any of three possible channel orders (A,B,C), (B,C,A), (C,A,B) in any memory row. Using the row shown in FIG. 8a, as an example, the data shown as item 1002 of FIG. 10 may be obtained as the two columns in item 802 and the one column of item 808. The desired 17 by 9 block of pixels lies entirely within the fetched 24 by 9 block of pixels and it is accessed by the processor 166 from the fetched block, stored in one of memories 168. The corresponding two 9 pixel by 5 line blocks of chrominance information lie entirely within a 24 pixel by 10 line data block which may be fetched from the data items 804 and 806, shown in FIG. 8a.

The particular addressing scheme shown in FIGS. 8a, 8b and 8c also has advantages when a reference macroblock to be accessed is split across multiple memory rows. This may occur, for example, in motion compensation processing because the forward and backward reference blocks are not constrained to block boundaries as they are stored in their respective fields. Indeed, a reference block may occur at any location in the frame to a resolution of one-half pixel. FIGS. 11a and 11b illustrate two different situations, one in which two 9-pixel by 5-line sets of chrominance values is split across four memory rows and one in which a 17-pixel by 9-pixel set of luminance values is split across four memory rows.

Because, as described above, the address for each of the three channels may be specified separately, and, because of the continuity of data across memory row boundaries, either of these situations may be handled with at most two memory accesses. Furthermore, due to the vertical interleaving of the addresses in the memory devices, these two memory accesses may be pipelined to decrease the amount of time needed to fetch the data relative to two fetch requests which cannot be pipelined. For the example shown in FIG. 11a, the block 1110 is accessed in two memory operations, the first operation sets the address for channel B to (D0, R1) and sets the address for channel C to (D0, R0). Channel A also has a memory access which may be either to (D0, R0) or (D0, R1). Because the data from channel A is not needed to recover the 9 by 5 sets of chrominance pixels, it is discarded. The second memory operation used to access the chrominance data sets assigns (D1, R1) as the address for channel B and assigns (D1, R0) as the address for channel C. Again, in this instance a dummy access is made on the A channel either to (D1, R0) or to (D1, R1). These requests recover the data shown in the block 1110. It is noted that the block 1110 contains ten lines, each containing two octbytes. Ten lines are needed because the U and V chrominance values are interleaved in the memory 120.

The two accesses used to obtain the 17 by 9 block of pixel values contained in the data set 1112 of FIG. 11b are the same as for the chrominance samples. The first access sets the addresses of channels A, B and C to (D0, R0), (D0, R0) and (D0, R1), respectively. The second access sets these addresses to (D1, R0), (D1, R0) and (D1, R1), respectively. These requests recover the data shown in the block 1112.

In the exemplary embodiment of the invention, the blocks of pixels 1110 and 1112 are transferred from the memory 120 to one of the memories 168 which are coupled to the half-pixel interpolator 166. The interpolator 166, responsive to the motion vector information for the macroblock that is currently being processed, then selects the appropriate portions of the blocks 1112 and 1110 which correspond to the 17 by 9 luminance pixel block and the two 9 by 5 chrominance pixel blocks.

Because the two memory accesses for both the chrominance data and the luminance data are to separate devices within the memory 120—the first memory access to device 0 on each of the channels, and the second memory access to device 1 on each of the channels—the pretouch feature of the RAMBUS system may be used to decrease the amount of time used to access the data relative to two independent memory requests. The pretouch feature allows data within memory rows that are in respectively different ones of the devices 514 and 516 (shown in FIG. 5) to be accessed at much higher speed than data within memory rows that use the same device.

Disregarding, for the moment, the pretouch feature, the general procedure for accessing a memory row uses the following steps, first a memory access request for the addressed row is made by specifying a device, a bank within the device, and a row within the bank as a part of the address. If the device, bank and row portions of this address are the same as the row that was just previously accessed, an acknowledge (ACK) signal is received and data may be transferred. If, however, the requested row is not the same as the last accessed row, then a negative acknowledge (NAK) is received and the memory 120 starts an internal setup operation in the logic circuitry 512 (shown in FIG. 5) which fetches the addressed data from the new row. If, after the setup operation is complete, a second request is presented, it is answered with an ACK and the requested data.

In the RAMBUS system, these random requests may be pipelined if they are to respectively different ones of the devices 514 and 516. Accordingly, a desirable method for requesting two rows such as 1102 and 1106 of FIG. 11a, which have different device numbers, is to request the first row and, after receiving the NAK, immediately request the second row. This request will also be answered with a NAK. Because the requests are made to separate devices, however, the individual logic circuits 512 of the two devices 514 and 516 (shown in FIG. 5) are processing the requests in parallel. When, however, the first row is requested again it is answered by an ACK and the requested data. After this data has been transferred, an immediate second request for the second row is also answered by an ACK and the requested data. This sequence of events occurs because the setup for device 514 can occur at the same time that data is being provided from device 516. The total time used for this double request to rows in different devices is approximately 650 ns.

The following table defines the worst case memory access timing for a system according to the present invention. The time interval for this table is the time required for processing a macroblock of pixel values of a main profile, high level signal, that is to say, 256 cycles of the 62.5 MHz clock signal. This interval is referred to as one macroblock time. For the worst case analysis, it is assumed four 17 by 9 blocks of luminance (Y) values and four 9 by 5 pairs of blocks of chrominance (UV) values are accessed to accomplish the motion compensation processing and that each block is split across four rows of the memory. As described above, the blocks are accessed as 24 pixels by 9 lines for the luminance information and 24 pixels by 10 lines for the chrominance information. It is also assumed that one macroblock of data is written into the memory 120 from the memories 162 and 164, that 384 pixel values (256 Y pixels and 128 UV pixels) are read from the memory for display, and that 6,144 bits of the input bit stream are read from the memory 120 into the VLD memory 121 or 124 or, alternatively, that 3,072 bits of the bit-stream data are written into the memory 120 from the memory 116, during the macroblock time.

The memory access shown in the table is stated in terms of a macroblock time. it is contemplated, however, that in accordance with the present invention, at least some of the fetch and store operations may occur over longer intervals and may transfer larger amounts of data.

TABLE

| Data | Time | Number of Clocks |
|---|---|---|
| Forward reference block | 1376 ns | 86 |
| Backward reference block | 1376 ns | 86 |
| Store decoded macroblock | 544 ns | 34 |
| Display 256 pixels, YUV | 528 ns | 33 |
| Store/Fetch bit-stream | 656 ns | 41 |
|  | 4480 | 280 |

Each of the forward and backward reference block accesses includes fetching two half-macroblocks, each half-macroblock including one 17 by 9 luminance block and two 9 by 5 chrominance blocks. The times shown in the table assume that each of the four 17 by 9 luminance blocks and eight 9 by 5 chrominance blocks is spread across four rows of the memory 120.

It is noted that the time required for this worst case macroblock cycle is slightly greater than the allowed time of 256 clock pulses. This should not be a problem, however, because this worst case condition should rarely occur. If this does occur, it must be during a B-frame when both a forward and backward reference block are accessed. In this instance the chrominance data for one of the references may be skipped. Although skipping this data may cause slight errors in the B-frame display, these errors would be less visible than other types of errors because the human eye is less sensitive to changes in color than to changes in luminance. In addition, these errors will not propagate to other frames since B frames are not used as anchor frames. Accordingly, the small excess time should not present a problem.

The only fixed time in the table is the time used to store the decoded pixels of one macroblock. The times to fetch the reference blocks may be less if, for example, the blocks do not cross memory row boundaries, or if no reference blocks are needed, such as when intraframe encoded data is being processed. The time used to display the decoded pixel values may be zero before an image is ready for display and in blanking intervals between image lines and image fields. Finally, as described above, the bit-stream data is stored and fetched in relatively large blocks at infrequent intervals; the value in the table for this operation represents a worst case. While the refreshing of the memory 120 has not been addressed, it is contemplated that this may be handled, for example, during the blanking portions of the image in place of display memory requests. Accordingly, the refresh timing does not need to be addressed as a separate timing constraint.

The memory scheme presented above is advantageous because it allows data representing image fields to be stored and fetched in several different ways. It may be stored in a format compatible with the MPEG-2 macroblock format and yet accessed in half-macroblocks of 16 by 8 pixels or 17 by 9 pixels in at most two memory requests. It may also be accessed in a format which aids in block to raster conversion.

While the invention has been described in terms of an exemplary embodiment, it is contemplated that it may be practiced as outlined above within the spirit and scope of the appended claims.

The invention claimed is:

1. Apparatus for decoding a data stream including a plurality of variable length encoded data values representing an image where the data stream represents video signals having luminance components and chrominance components, the apparatus comprising:

a memory for storing image data where the memory has a single memory port which includes first and second channels, arranged in parallel, wherein each memory operation to the single memory port concurrently transfers data via the first and second channels and the image data is arranged in the memory to allow image data representing corresponding chrominance and luminance components to be accessed concurrently using the first and second channels, respectively, and to allow image data representing first and second contiguous luminance components to be accessed concurrently using the first and second channels, respectively;

means for receiving the data stream and for storing the data stream into a buffer area of the memory via the single memory port;

decoding means including:
(a) means for fetching the variable length encoded data stream from the memory via the single memory port;
(b) means for processing the fetched variable length encoded data stream to produce first decoded values;
(c) means for fetching reference image data from the memory via the single memory port;
(d) means for combining the fetched reference image data with the first decoded values to produce second decoded values; and
(e) means for storing the second decoded values in the memory via the single memory port; and means for fetching image data from the memory, via the single memory port, for display.

2. Apparatus for decoding a data stream including a plurality of variable length encoded data values representing an image where the data stream represents video signals having luminance components and chrominance components, the apparatus comprising:

a memory for storing image data where the memory has a single memory port which includes first and second channels, arranged in parallel, wherein each memory operation to the single memory port concurrently transfers data via the first and second channels and the image data is arranged in the memory to allow components of the image data to be accessed concurrently using the first and second channels;

means for receiving the data stream and for storing the data stream into a buffer area of the memory via the single memory port;

decoding means including:
(a) means for fetching the variable length encoded data stream from the memory via the single memory port;
(b) means for (1) processing the fetched variable length encoded data stream to produce first decoded values and (2) generating luminance values and corresponding chrominance values as the first decoded values;
(c) means for fetching reference image data from the memory via the single memory port;
(d) means for combining the fetched reference image data with the first decoded values to produce second decoded values; and (e) means (1) for storing the second decoded values in the memory via the single memory port and (2) for storing luminance components of the second decoded values using one of the first and second channels and storing corresponding chrominance components of the second decoded values using the other one of the first and second channels; and means (1) for fetching image data from the memory, via the single memory port, for display and (2) for fetching luminance components of the image data using one of the first and second channels and for fetching the corresponding chrominance components of the image data using the other one of the first and second channels.

3. Apparatus according to claim 2 wherein:

the memory includes first, second and third channels, wherein each memory operation to the single memory port transfers data via the first, second and third channels; and the means for storing the second decoded values in the memory includes:
means for alternately storing successive sets of luminance values using: the first and second channel, the second and third channel, and the third and first channel, respectively, and for alternately storing successive sets of chrominance values using: the third channel, the first channel, and the second channel, respectively.

4. Apparatus according to claim 3 wherein:

the means for fetching the reference image data uses the first, second and third channels to fetch luminance components and uses at least two of the first, second and third channels to fetch the corresponding chrominance components.

5. A circuit for decoding video signals encoded according to the MPEG-2 standard, consisting essentially of:

an image memory for storing image data where the image memory has a single memory port which includes first and second channels, arranged in parallel, wherein each memory operation which uses the single memory port concurrently transfers data via the first and second channels and the image data is arranged in the memory to allow respectively different components of the image data to be accessed concurrently using the first and second channels;

a decoding processor including:
a variable length decoder coupled to the image memory via the single memory port;
an inverse quantization processor;
an inverse discrete cosine transform processor; and
a motion compensation processor, coupled to the image memory via the single memory port; and a block to raster converter, coupled to the image memory via the single memory port.

6. A circuit according to claim 5 wherein the motion compensation processor includes at least first and second input ports coupled to the image memory via the single memory port and an output port coupled to the image memory via the single memory port.

7. A system which synchronizes an internally generated oscillatory signal to an externally supplied multi-bit phase reference signal comprising:

an oscillator, responsive to a control signal for generating the oscillatory signal;

a counter, coupled to the oscillator for counting pulses of the oscillatory signal to produce a count value;

a digital comparator for comparing the count value to the multi-bit phase reference signal to generate a phase difference signal;

means for filtering the phase difference signal to generate a phase change signal;

a source of phase reference signal, said phase reference signal, when applied to the oscillator as the control signal, causing the oscillator to generate the oscillatory signal at a predetermined frequency;

means for combining the multi-bit phase reference signal with the phase change signal to generate the control signal; and synchronizing means for substituting at least a first portion of the multi-bit phase reference signal for the count value to synchronize the count value to the phase reference signal.

8. A system according to claim 7 wherein:

the oscillatory signal is the system clock signal specified in a bit-stream encoded according to the MPEG-2 standard;

the externally supplied phase reference signal is either an ESCR value or a SCR value extracted from the bit-stream; and the comparator includes a subtracter which subtracts the count value from the first portion of the phase reference signal to generate a difference signal and signal scaling means which scales the difference signal by a scale factor to generate the phase difference signal.

* * * * *